D. B. RUSSELL.
ATTACHING AND RELEASING DEVICE.
APPLICATION FILED JULY 24, 1908.
913,673.
Patented Feb. 23, 1909.
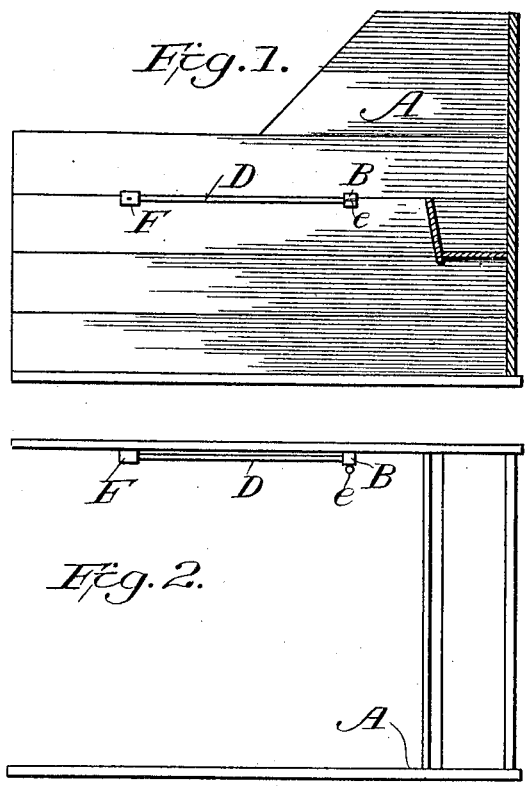
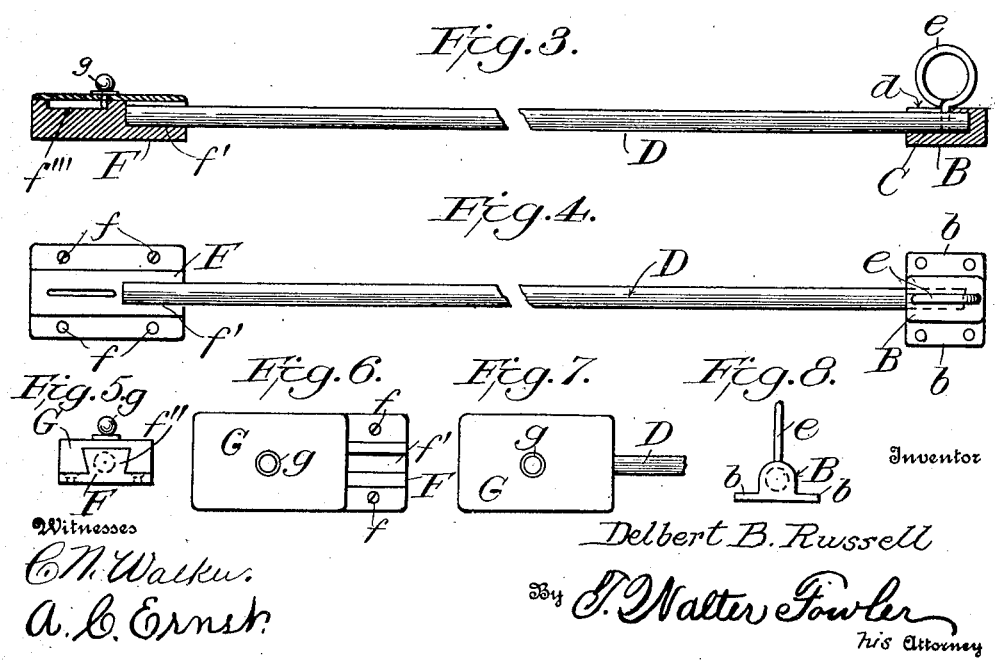
Inventor
Delbert B. Russell
By T. Walter Fowler
his Attorney
Witnesses
C. N. Walker.
A. C. Ernst.
THE NORRIS PETERS CO., WASHINGTON, D. C.

UNITED STATES PATENT OFFICE.

DELBERT B. RUSSELL, OF SALT LAKE CITY, UTAH, ASSIGNOR OF FIFTY-ONE ONE-HUNDREDTHS TO JAMES B. KEYSOR, OF SALT LAKE CITY, UTAH.

ATTACHING AND RELEASING DEVICE.

No. 913,673.  Specification of Letters Patent.  Patented Feb. 23, 1909.

Application filed July 24, 1908. Serial No. 445,226.

*To all whom it may concern:*

Be it known that I, DELBERT B. RUSSELL, a citizen of the United States, residing at Salt Lake City, in the county of Salt Lake and State of Utah, have invented certain new and useful Improvements in Attaching and Releasing Devices, of which the following is a specification.

My invention relates to means for hitching and releasing horses, cattle, and other animals, the invention being designed to be used in connection with the stalls in which animals are kept in stables, barns, etc.

It is quite apparent to every one who has had the handling and management of horses that it is sometimes very difficult to get a horse out of a burning building and to keep him under management while removing him from a building on fire, and by reason of this fact it frequently occurs that the animal breaks away from the keeper and is lost.

The object of the present invention is to provide a simple and effective means by which the animal may be speedily released and positively directed out of the burning structure, said means providing not only for the release of the animal but, also, for guiding him safely from the zone of danger.

With the above and other objects in view, my invention consists of the parts and the constructions and combinations of parts which I will hereinafter describe and claim.

In the accompanying drawings forming part of this specification and in which similar letters of reference indicate like parts in the several views:—Figure 1, is a sectional view of a stall, showing my improvements attached thereto. Fig. 2, is a plan view of Fig. 1. Fig. 3, is an enlarged elevation, partially in section, of the attaching and detaching devices detached from the stall. Fig. 4, is a plan view of Fig. 3. Figs. 5, 6, 7 and 8 are details of construction.

In carrying out my invention, I may attach the same to the inside of a stall or to the wall of any other structure in which the animal is normally stabled, said attachment extending horizontally along the side wall of the stall and including means at opposite ends for securing the attaching member and permitting the ready release of the animal in case of emergency, or when removing the animal from the stall for watering or when returning him to the stall.

The stall A may be of any appropriate character. Secured to the side of the stall or its equivalent at a suitable distance from the head end thereof, is a holder or casting, B, having projecting base flanges, $b$, with suitable holes to receive screws by which said plate is secured against the side wall of the stall. This holder or casting is provided with a socket C and a longitudinally-extending slot $d$, said socket being adapted to receive the forward end of the rod, D, and said rod having firmly secured to its front end an eye or loop, $e$, the shank of which slidably engages the slot, $d$, in the holder or casting B, and said eye or loop being adapted to engage with an end of a suitable halter strap, not shown, with which the animal is usually supplied.

At a suitable distance from the holder or casting, B, say at approximately one and one-half feet from the rear end of the stall, is secured another holder or casting, F, having a flanged base by which it is secured to the side of the stall by means of appropriate screws, $f$, or like fastening devices. This holder or casting, F, is provided with a recess or socket, $f'$, in its forward end adapted to receive the rear end of the rod, D, whereby when said rod is in normal position its opposite ends are suitably supported and housed in the sockets of the two holders, B, and F.

The rear holder or casting, F, is preferably formed with a longitudinally-extending rib or lug, $f''$, which may be of dove-tail shape in section, and the upper surface of this rib or lug rearward of the socket, is provided with a longitudinally-extending groove or channel, $f''''$.

Slidably mounted upon the rear holder or casting, F, is a cover-plate, G, of approximately the same width and length of the holder and having its forward end adapted to fit over and cover the open-side of the socket, $f'$, in said holder or casting. In order that the cover-plate may be slidably fitted to the holder or casting, F, I provide said cover-plate with a screw or pin, $g$, which projects from its inner face and engages the slot or channel in the lug, $f^2$, of said holder, F, the head of said screw or pin serving as an operating finger piece whereby the cover-plate may be moved longitudinally relative to the holder or casting, F, to uncover the socket end of the holder or casting, F, and thereby release the rear end of the rod, D.

In operation, the before-mentioned parts are normally arranged as shown in Figs. 3 and 4, the front end of the rod, D, being seated in its socket in the holder or casting, B, with the loop or ring, e, exposed for ready engagement with the halter-strap of the animal, and with the rear end of the rod engaged in the socket of the rear holder or casting, F, and prevented from detachment therefrom by the cover-plate. In case of emergency, as the burning of the stable or structure in which the animal is housed and where it is necessary to quickly remove the animal, the rescuing party may enter the stable and have ready access to the rear fastening devices, and by engaging the finger piece of the cover-plate, G, and sliding this plate rearwardly, the rear end of the rod, D, may be lifted from the socket piece of the rear holder or casting and then drawn rearwardly to slide the front end of the rod with its eye or loop, out of its connection with the front holder or casting B, thus detaching the securing devices and permitting the rescuer to guide the horse from the stall, by means of the rigid connecting rod, D, to which the animal is attached.

The above construction is also useful when taking the horse to water and returning him to the stall, as the rod, D, permits the movements of the horse to be controlled and guided and no tying and untying is necessary, as the operator walks the horse into the stall and from the back of said stall and directs the forward end of the rod into connection with the forward holder or casting and then slips the rear end of the rod into the socket end of the rear holder or casting and secures the same by slipping the cover-plate over the rear end of the rod and securing it by means of the hand-screw $g$. The pin, $g$, working in the groove $f'''$, prevents the complete disengagement of the cover-plate by the pin striking one end wall of said groove, and said pin also prevents the cover-plate being pushed too far forward, by contacting with the other or forward end wall of said groove.

Having thus described my invention what I claim and desire to secure by Letters Patent is:—

1. In attaching and releasing devices of the character described the combination of holders adapted to be secured at opposite ends of a stall, and a rod extending between said holders and having means for the attachment of an animal, said holders having sockets or recesses for the opposite ends of the rod, and one of said holders having a movable cover-plate for detachably housing an adjacent end of the rod.

2. In attaching and releasing devices, a rod adapted to extend lengthwise of a stall and having one end provided with means for the attachment of an animal, a holder having a socket or recess for detachably receiving the front end of said rod, a holder having a socket or recess for detachably receiving the rear end of the rod, and a cover-plate for the second-named holder movably mounted thereon and adapted to cover and uncover the socket thereof.

3. An attaching and releasing means, comprising a rod having means for the attachment of an animal, and holders for the opposite ends of said rod, each of said holders having a socket into and out of which the rod is passed, and one of said holders having a rib provided with a groove or channel, and a cover-plate slidably-engaging said rib and having a pin operating in said groove or channel and limiting the sliding movement of said cover-plate.

In testimony whereof I affix my signature in presence of two witnesses.

DELBERT B. RUSSELL.

Witnesses
  G. A. HEDGER,
  H. S. SCHOFIELD.